Figure 1:
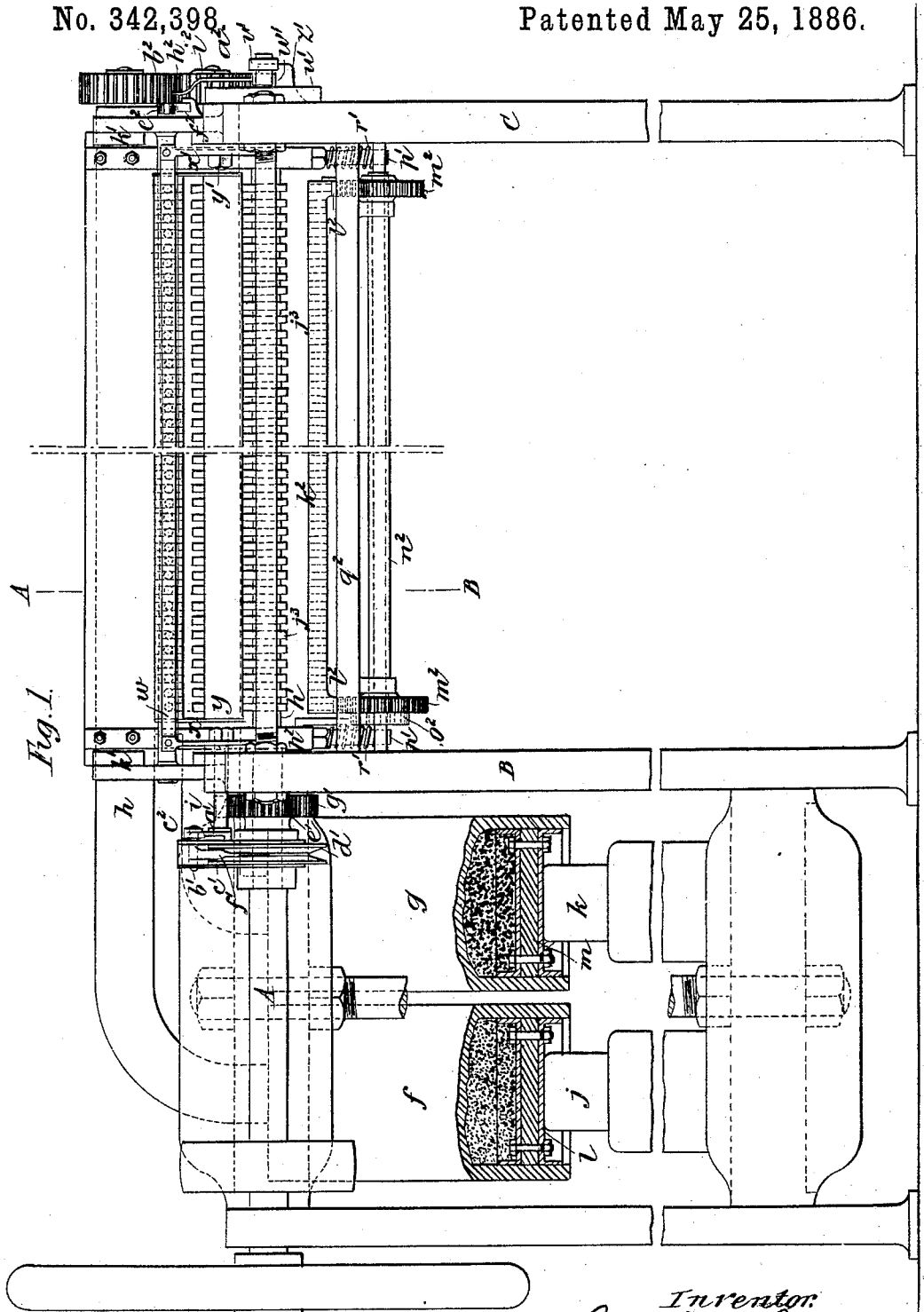

(No Model.) 4 Sheets—Sheet 2.

G. A. SWEETSER.
APPARATUS FOR THE MANUFACTURE OF MATCHES.

No. 342,398. Patented May 25, 1886.

Witnesses
Will T. Norton
R. B. Washington

Inventor
George Albert Sweetser
By John J. Halsted & Son
his Attys (No Model.) 4 Sheets—Sheet 3.

G. A. SWEETSER.
APPARATUS FOR THE MANUFACTURE OF MATCHES.

No. 342,398. Patented May 25, 1886.

Witnesses. Inventor:
Will T. Norton George Albert Sweetser
R. B. Washington. By John J. Halsted & Son
His Atty's N. PETERS, Photo-Lithographer, Washington, D. C.

(No Model.)  4 Sheets—Sheet 4.
G. A. SWEETSER.
APPARATUS FOR THE MANUFACTURE OF MATCHES.
No. 342,398. Patented May 25, 1886.
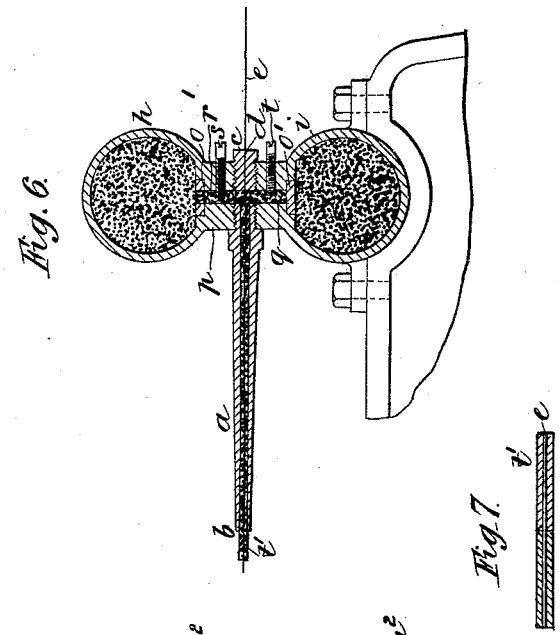
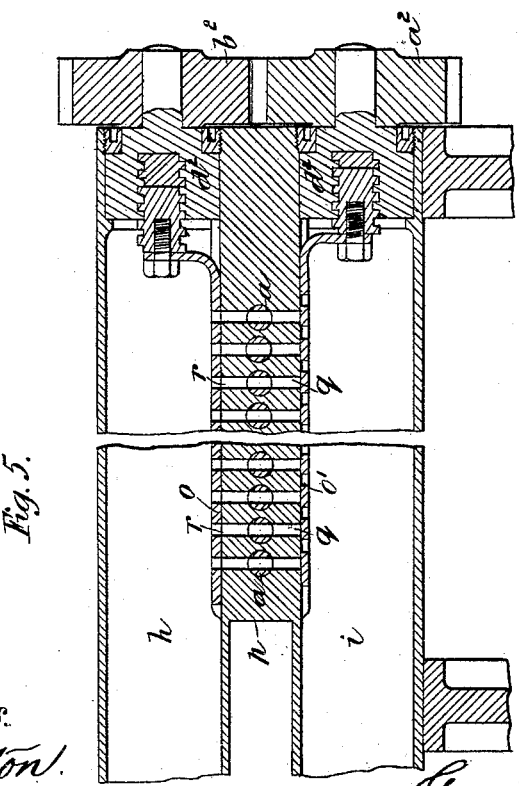
Witnesses.  
Will T. Norton  
R. B. Washington
Inventor.  
George Albert Sweetser  
John J. Halsted + Son  
his attys.

UNITED STATES PATENT OFFICE.

GEORGE A. SWEETSER, OF LONDON, ENGLAND.

APPARATUS FOR THE MANUFACTURE OF MATCHES.

SPECIFICATION forming part of Letters Patent No. 342,398, dated May 25, 1886.

Application filed July 16, 1885. Serial No. 171,819. (No model.) Patented in England September 18, 1884, No. 12,551; in Germany July 7, 1885, No. 35,552; in France July 10, 1885, No. 170,062; in Belgium July 18, 1885, No. 69,643; in Italy September 30, 1885, XIX, 18,850, XXXVII, 262, and in Austria-Hungary January 1, 1886, No. 34,208 and No. 65,581.

*To all whom it may concern:*

Be it known that I, GEORGE ALBERT SWEETSER, a subject of the Queen of Great Britain, residing at London, England, have invented new and useful Improvements in the Manufacture of Cigar-Lights or Fusees and Apparatus and Compositions Therefor, of which the following is a specification.

Hitherto in the manufacture of cigar-lights, fusees, or vesuvians it has been generally the practice to employ a stem of suitable material—such as wood, glass, or porcelain—one end of which stem has been dipped in the required combustible material, which is applied separately from the igniting composition. This mode of manufacture is tedious and involves much labor, and the article produced is clumsy and unsightly in appearance, and requires relatively a large amount of space when put up in boxes for use.

My invention relates to the manufacture of the cigar-lights, fusees, or vesuvians by means of suitable molding apparatus, as hereinafter described. As will be seen, I avoid the dipping operation hereinbefore referred to now in use, and produce the articles of uniform size and shape and in a more simple, economical, and speedy manner than hitherto.

According to one arrangement for carrying out my invention, whereby I form a continuous length of coated core, which is afterward cut up so as to enable separate lights or fusees to be produced, I employ a tube or die (or a series of tubes or dies) having an internal diameter corresponding with the diameter of the cigar-light, fusee, or vesuvian to be formed. One end of the tube or die is open and the other end is closed, with the exception of a small hole to allow of the passage of a core, which is preferably formed of wire coming from a coil. I connect this tube or die by a suitable passage or passages to two cylinders, one filled with suitable combustible composition, such as is hereinafter described, and the other with non-combustible composition in a semi fluid or plastic condition. Both compositions are kept under pressure by plungers operated in any suitable manner, or by other suitable means for forcing the compositions into the tube or die containing the wire or other core. I provide a valve or valves constructed so as to admit either of the compositions to the tube or die as required, so that by a movement of the valve the core in the tube or die will be alternately coated with combustible and non-combustible composition, and the coated core is squeezed out of the open end of the tube or die, the friction of the composition on the core dragging the same through with it. This coated wire or other core has to then only to be cut up into suitable lengths and dipped in any usual igniting composition to form cigar-lights, fusees, or vesuvians, the combustible portion forming the burning ends and the non-combustible portion forming the stems to hold them by.

The number of tubes or dies in the machine can be increased to any practicable extent, and may be used with the two cylinders and the one valve.

In order to enable my invention to be fully understood, I will proceed to describe the same by reference to the accompanying drawings, in which—

Figure 2:
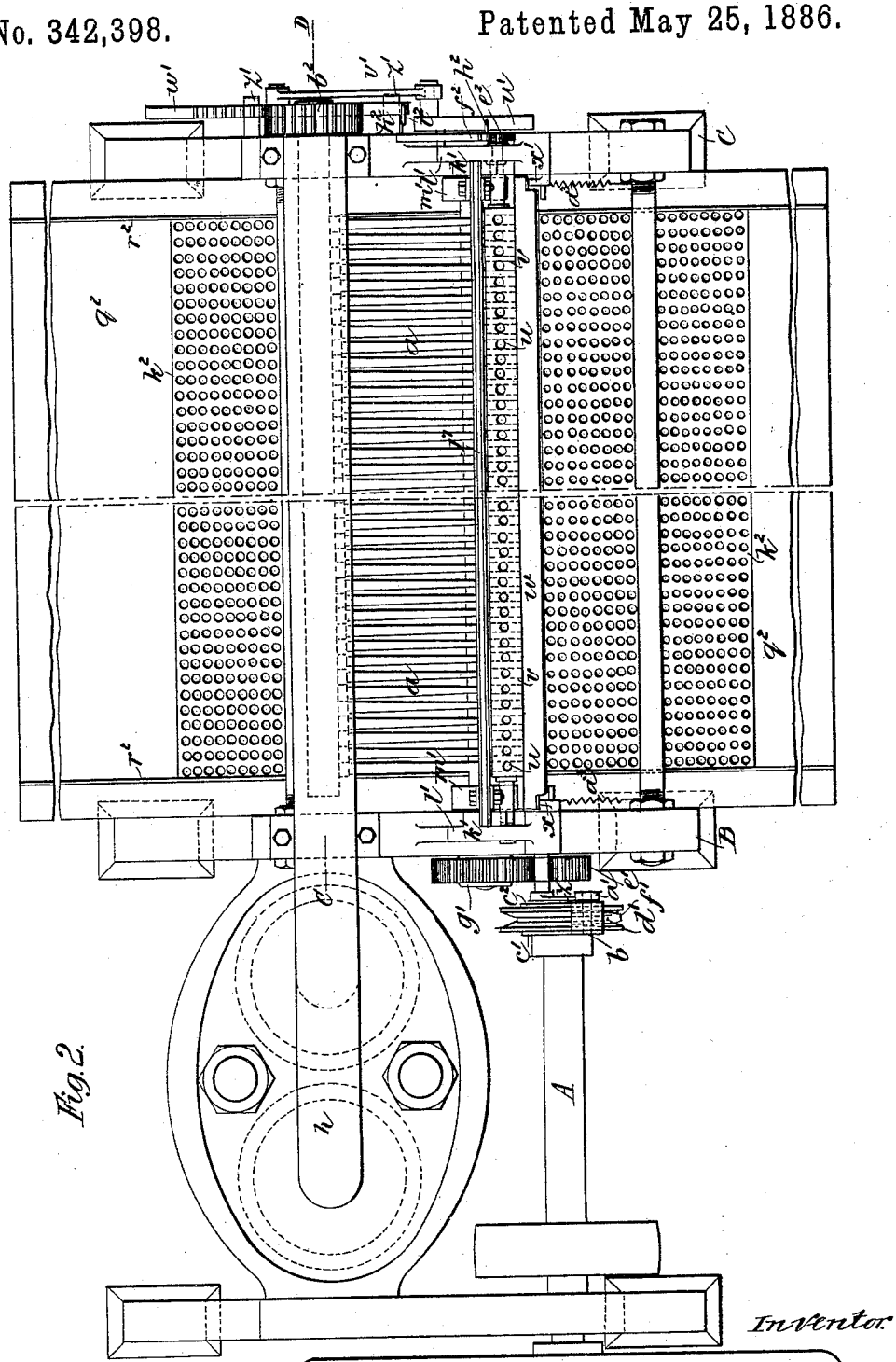
Figure 3:
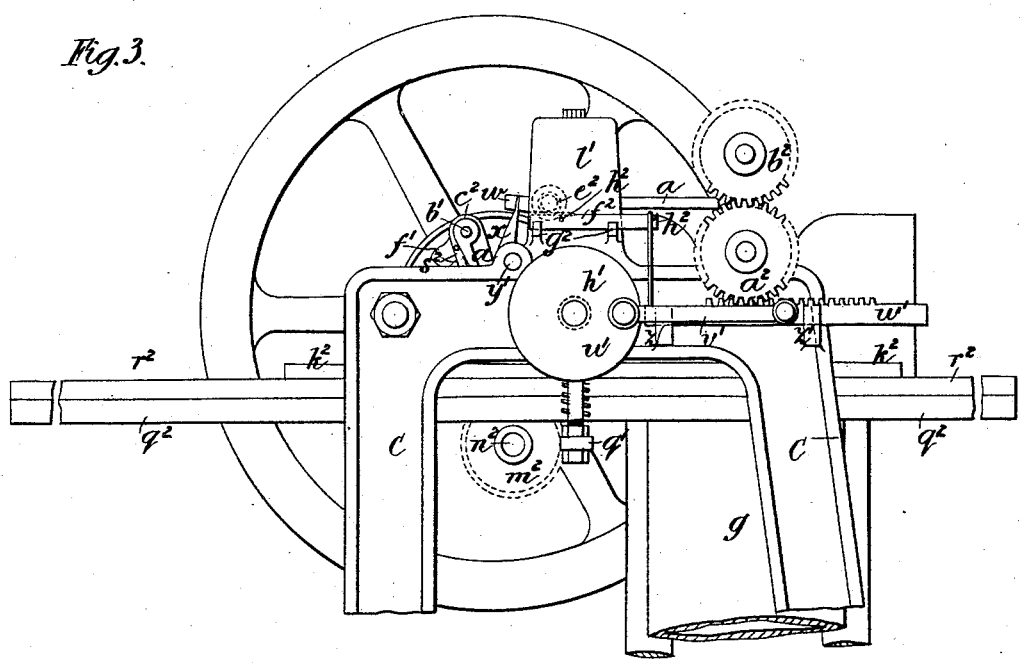
Figure 4:
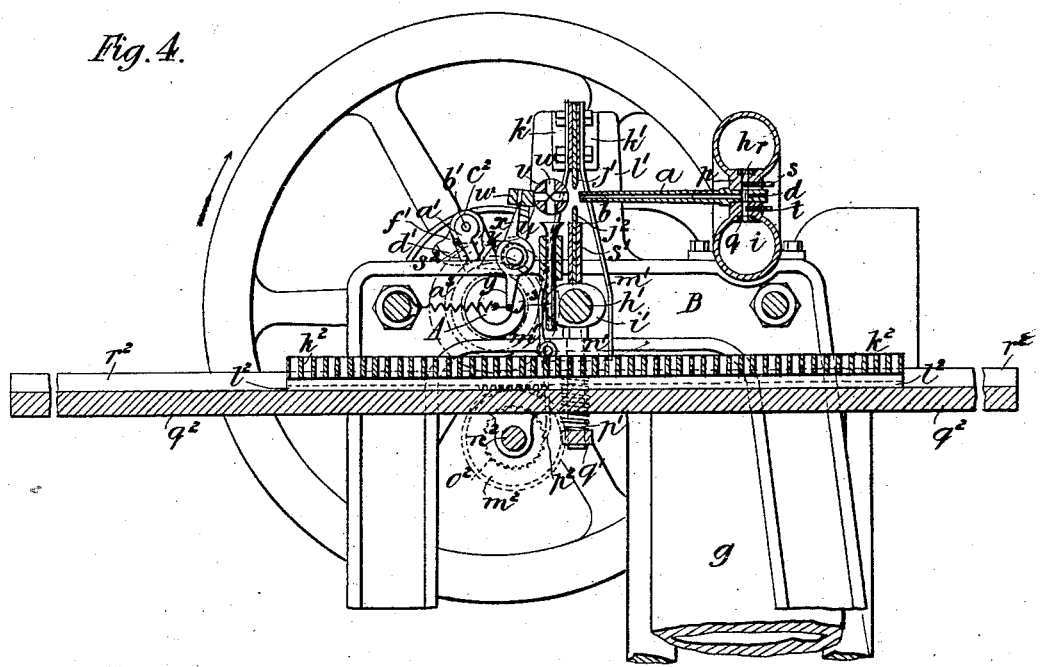

Figure 1 is a front elevation, Fig. 2 a plan, and Fig. 3 an end view, of an apparatus suitable for manufacturing cigar-lights or fusees according to my invention. Fig. 4 is a transverse vertical section of the same on line A B of Fig. 1. Fig. 5 is a part longituidnal section, enlarged, on line C D of Fig. 2. Fig. 6 is a transverse section of Fig. 5. Fig. 7 is a longitudinal section of a cigar-light, fusee, or vesuvian manufactured according to my invention, ready to receive the igniting composition. Figs. 1 to 4 are drawn to a scale of about one-fourth full size; Figs. 5 and 6, about half full size, and Fig. 7 full size.

Similar letters in all the figures represent similar parts.

*a a* are the series of tubes or dies having an internal diameter corresponding with the diameter of the cigar-lights, fusees, or vesuvians to be formed.

*b b* are the open ends of the tubes or dies, and *c c* the ends thereof, which are closed, with the exception of the small holes *d d*.

*e*, Fig. 6, is the wire which I use by preference to form the core, and which comes from a suitably-placed coil. (Not shown in the drawings.)

$f$ and $g$ are the two cylinders, one of which cylinders, $f$, is filled with suitable combustible composition. The other cylinder, $g$, is filled with non-combustible composition, both compositions being in a semi-fluid or plastic condition.

$h$ and $i$ are the passages connecting the series of tubes or dies $a$ with the cylinders $f$ and $g$, respectively.

$j$ and $k$, Fig. 1, represent the plungers working, respectively, in the cylinders $f$ and $g$, and operated by suitable means—such as by hydraulic or screw pressure—and serving, by means of the loose pistons $l$ and $m$, to keep the composition in the cylinders under pressure, so as to force the same into the tubes or dies $a$. The pistons $l$ and $m$ are provided with a cup leather, $n$, on each side, whereby, when the pistons have reached the tops of the cylinders by reason of the composition being exhausted, they can be worked back, the cylinders being then turned upside down for this purpose.

$o$ $o'$ are the valves in the passages $h$ and $i$, respectively, which valves are operated, as hereinafter described, so as to alternately admit the combustible and non-combustible compositions to the tubes or dies $a$, whereby the core $e$ is coated on alternate portions of its length with the said compositions, respectively.

$p$ is a connecting-piece between the two passages $h$ and $i$.

$q$ and $r$ are passages in the connecting-piece $p$, leading from the passages $h$ and $i$ to the tubes or dies $a$.

$s$ and $t$ are supplementary valves, which I find it advantageous to employ for regulating the admission of the compositions to the tubes or dies $a$.

$v$ is a cylinder rotating opposite the open ends of the tubes or dies $a$, the said cylinder being furnished opposite each die with two transverse openings, $u$, at right angles to each other, and of somewhat larger diameter than the interior diameter of the dies $a$. As the coated core $t'$ passes out of the open ends $b$ of the tubes or dies $a$ it enters one of the two corresponding transverse passages, $u$, in the cylinder $v$, which is partially rotated at intervals in a backward and forward direction, as hereinafter described. The required length of the coated core $t'$ is determined by the end thereof coming in contact with a bar, $w$, extending from one side of the machine to the other, and normally caused to bear against the cylinder $v$ by means of a spring, $a^3$. The bar $w$ is fixed to arms $x$ $x'$, pivoted at $y$ $y'$ to the frame of the machine. The pivot $y$ is provided with a projection or arm, $z$, which serves as a catch to a similar arm, $a'$, fixed to a pin, $b'$, pivoting in two plates, $c'$ $c^2$, which can be rotated round the main shaft A of the machine and are mounted loosely on each side of a grooved wheel, $d'$, which is fixed on the said main shaft A operated by hand or by power.

$e'$ is a pinion mounted loosely on the shaft A and fixed to the plate $c^2$.

$f'$ is a pawl fixed on the pin $b'$, and engaging, when required, in the groove of the wheel $d'$.

The pinion $e'$ gears with a spur-wheel, $g'$, mounted on a shaft, $h'$, extending across the machine.

$i'$ $i'$ are cams fitted to the shaft $h'$ and serving as the shaft rotates to operate a pair of knives, $j'$ $j^2$, for cutting the coated core $t'$ into lengths, as follows: The upper knife, $j'$, slides in guides $k'$ on extensions $l'$ of the parts B and C of the frame of the machine.

From the knife $j'$, at each end, extends a pair of connecting-arms, $m'$, to a point below the cam $k'$, where they are connected by a cross-head, $n'$. In the center of and fixed to the cross-head is a rod $p'$, one end of which bears against the under side of the cam $i'$. The other end of the rod $p'$ works in a guide, $q'$.

$r'$ is a spring serving to keep the rod $p'$ pressed against the cam $i'$. The lower knife, $j^2$, works in guides $s'$ and rests upon the cam $i'$. In this manner the cams $i'$ in rotating cause the knives to approach each other and cut off the coated core $t'$ to form the fusees. The knife $j^2$ is kept pressed against the cam $i'$ by reason of its weight. On that end of the shaft $h'$ which projects beyond the part C of the frame of the machine is fixed a disk-crank, $u'$, to which one end of a connecting-rod, $v'$, is attached. The other end is pivoted to a movable rack, $w'$, working in guides $z'$. The rack $w'$ gears with a toothed wheel, $a^2$, which gears with a toothed wheel, $b^2$. Each of the said toothed wheels has a nut, $d^2$, fixed thereto and rotating with the said wheels, the threads of the nuts working on corresponding screw-threads on the ends of the valves, so as to give an alternate reciprocating motion to the valves. On the end of the cylinder $v$, extending beyond the part $l'$ of the part C of the frame of the machine, is fixed a pinion, $e^2$, gearing with a rack, $f^2$, which works in guides $g^2$, as shown. On the rack $f^2$ are pins or projections $h^2$, whereby a backward and forward movement is communicated to the rack $f^2$ by means of an arm, $i^2$, on the rack $w'$. By this means a partial rotation is given to the cylinder $v$, first in one direction and then in the other, for the purpose of depositing all the lengths of coated core cut off in one position—that is to say, with their combustible portions in one direction. This is rendered necessary because the length of core to form the fusees is cut by the knives, first in the middle of a combustible portion and then in the middle of a non-combustible portion, and so on. As the fusees are cut off, the cylinder $v$ will cause them to pass through chutes $j^3$ into the drying-frame $k^2$, which is caused to travel along under the chutes so as to bring a fresh row of holes into position at each operation of the machine by means of a rack, $l^2$, fixed to the drying-frame at each side of the machine and operated by a pinion, $m^2$, on a shaft, $n^2$, on one end of which shaft is also fixed a ratchet-wheel, $o^2$, operated by a pawl, $p^2$, attached to the cross-head $n'$, which pawl moves the ratchet-wheel $o^2$ forward one tooth each time the cross-head $n'$ descends. The rack $l^2$ is supported and runs on a table, $q^2$, and is guided by flanges or plates $r^2$.

The operation of the machine is as follows: The cylinders $f$ and $g$, having been supplied with plastic combustible and non-combustible compositions, respectively, pressure is applied to the plungers $j$ and $k$, and thereby to the pistons $l$ and $m$, and the main shaft A of the machine is set in motion. When the machine is first used, the composition from one of the cylinders will pass into and fill the tubes or dies $a$, and coat the core $e$, which is dragged forward by the composition; and it will be seen that a portion of the wire nearly equal to the length of the tubes or dies will be thereby coated with one composition only before the valves $o$ and $o'$ can commence to operate. This portion will be useless to form fusees, and will therefore be wasted. As the coated core $t'$ emerges from the ends $b$ of the tubes or dies $a$ it will pass through the cylinder $v$, by that one of the passages $u$ which is at that time horizontal, and will move the bar $w$ outward, whereby the catch $z$ will be lowered and will release the arm $a'$. The pawl $f'$ will then be free to engage in the groove of the wheel $d'$, the pawl being pressed into engagement by the spring $s^2$, bearing upon the arm $a'$. The grooved wheel, which continually rotates with the main shaft A, will thereby rotate the pawl $f'$, plates $c'$ $c^2$, and pinion $e'$, which latter, gearing with the wheel $g'$, will rotate the cam-shaft $h'$ and cams $i'$, and the knives will be caused to approach each other and will cut off the projecting lengths of coated core $t'$. The cam-shaft $h'$ in rotating will, by means of the disk-crank $u'$ and connecting-rod $v'$, operate the rack $w'$. The movement of the rack $w'$ will, by means of the arm $i^2$ coming against the pins or projections $h^2$, be communicated to the rack $f^2$, and the pinion $e^2$ will be rotated and will turn the cylinder $v$, containing the cut-off lengths of coated core, a quarter of a revolution, and the said lengths will then fall through the chutes $j^3$ into the drying-frame $k^2$, which, as hereinbefore described, is moved forward so as to bring an empty row of holes into position under the chutes $j^3$ for the reception of the cut lengths. The rack $w'$ in its movement will cause the wheels $a^2$ and $b^2$ to rotate in opposite directions, thereby causing, by means of the screw-threaded nut $d^2$, the valve $o'$ to open its ports $q$, and the valve $o$ to close its ports $r$, or vice versa. One of the two compositions (the combustible composition, for example) will thus be caused to enter the tubes or dies $a$, while the other (the non-combustible) composition will be withheld from doing so. When a quantity of the combustible composition has been fed forward from the open valve sufficient to press outward the bar $w$, a similar operation of the parts of the machine to that already described will take place, and the other valve will be opened, so as to feed forward the other composition, and so on. When one drying-frame, $k^2$, has been completely filled, it is removed for the cut-off lengths of coated core to be provided in any known manner with any usual igniting composition to complete the cigar-lights, fusees, or vesuvians. A fresh frame is then placed in position to be filled by the machine, and so on.

Instead of employing a valve or valves arranged as hereinbefore described, the pressure of the compositions may be made intermittent by any other suitable arrangement, so that only that composition under pressure would flow into the tube or die, the other composition remaining stationary.

I employ a core, as above named, for the purpose of giving rigidity to the articles; but the core can be omitted, and instead of employing wire for the core a wood splint or other suitable material may be used, and the core instead of being in the center of the article may be on the side thereof.

It will be obvious that only one cylinder may be employed—videlicit, the cylinder containing the combustible composition. In this case portions of the combustible material would require to be stripped off the wire or other core, such stripped part forming the stems or holders; or, when making the stems only for cigar-lights or fusees, only one cylinder will be required.

Having now described my invention and in what manner the same is to be performed, what I claim is—

1. In an apparatus for manufacturing cigar-lights or fusees, the combination of two cylinders for holding, respectively, combustible and non-combustible compositions in a plastic state, tubes or passage-ways leading from said cylinders, loose pistons for working in said cylinders, and plungers for operating the same, series of tubes or dies for forming the fusees, and valves leading from the passage-ways to the dies, to admit to the same intermittently the combustible and non-combustible compositions, substantially as shown and described.

2. In an apparatus for manufacturing cigar-lights or fusees, the combination of the passage-ways $h$ and $i$, leading, respectively, from a cylinder containing combustible and another containing non-combustible compositions, passage-ways $q$ and $r$, valves $o$ and $o'$, regulating-valves $s$ and $t$, tubes or dies $a$, for forming the fusees, and means for forcing the combustible and non-combustible compositions alternately through ways, valves, and dies, all substantially as shown and described.

3. In an apparatus for manufacturing cigar-lights or fusees, the combination of the passage-ways $h$ and $i$, leading, respectively, from a cylinder containing combustible and another containing non-combustible compositions, and passage-ways $q\ r$, with the shaft $h'$, crank $u'$, connecting-rod $v'$, rack $w'$, gears $a^2$ and $b^2$, their nuts $d^2$, and the valves $o$ and $o'$, the combination serving to give said valves an alternate reciprocating motion, so as to admit the combustible and non-combustible compositions alternately to the dies, substantially as described.

4. In an apparatus for manufacturing cigar-lights or fusees, the combination of the passage-ways $h$ and $i$, $q$ and $r$, the molding-dies $a$, and means for forcing the compositions through the same, the cylinder $v$, pivoted bar $w$, catch $z$, arm $a'$, pawl $f'$, wheel $d'$, plates $c'$ $c^2$, pinion $e'$, gear $g'$, shaft $h'$, cams $i'$, and knives operated by said cams, all substantially as shown and described.

5. In an apparatus for manufacturing cigar-lights and fusees, the combination of the pivoted bar $w$, catch $z$, arm $a$, pawl $f'$, wheel $d'$, plates $c'$ $c^2$, pinion $e'$, gear $g'$, shaft $h'$, cams $i'$, knife $j^2$, resting on upper side of cam $i'$, rod $p'$, bearing on under side of cam $i'$, cross-head $n'$, connecting-arm $m$, and knife $j'$, all operating substantially as shown and described.

6. In an apparatus for manufacturing cigar-lights and fusees, the combination of the shaft $h'$, disk-crank $u'$, connecting-rod $v'$, rack $w'$, arm $i^2$, pins $h^2$, rack $f^2$, and pinion $e^2$, the combination serving to revolve the cylinder $v$ a quarter of a revolution, so as to allow the cut off fusees to drop into the chutes $j^3$, all substantially as shown and described.

7. In an apparatus for manufacturing cigar-lights and fusees, the combination of the shaft $h'$, cam $i'$, rod $p'$, bearing on the under side of said cam, cross-head $n'$, pawl $p^2$, attached to same, ratchet $o^2$, shaft $n^2$, pinion $m^2$, and rack $l^3$ on the frame $k^2$, the combination serving to bring the holes in said frame in position under the chutes, all substantially as shown and described.

8. In combination, the cylinders $f$ and $g$, their passage-ways $h$ and $i$, and means for forcing the combustible and non-combustible compositions through the same, passage-ways $q\ r$, shaft $h'$, crank $u'$, connecting-rod $v'$, rack $w'$, pinions $a^2\ b^2$, valves $o$ and $o'$, molds $a$, cylinder $v$, pivoted bar $w$, catch $z$, arm $a'$, pawl $f'$, wheel $d'$, plates $c'$ $c^2$, pinion $e'$, gear $g'$, and cams $i'$ on shaft $h'$, knife $j^2$, rod $p'$, cross-head $n'$, arms $i^2$, attached to rack $w'$, pins $h^2$, rack $f^2$, pinions $e^2$, pawl $p^2$, attached to the cross-head $n'$, ratchet $o^2$, shaft $n^2$, pinion $m^2$, rack $l^2$, and frame $k^2$, all combined and operating substantially as shown and described.

GEORGE A. SWEETSER.

Witnesses:
A. ALBUTT,
B. BRADY.